Jan. 18, 1938. H. A. FABER 2,106,025
AIR FILTER AND HUMIDIFIER
Filed July 14, 1936
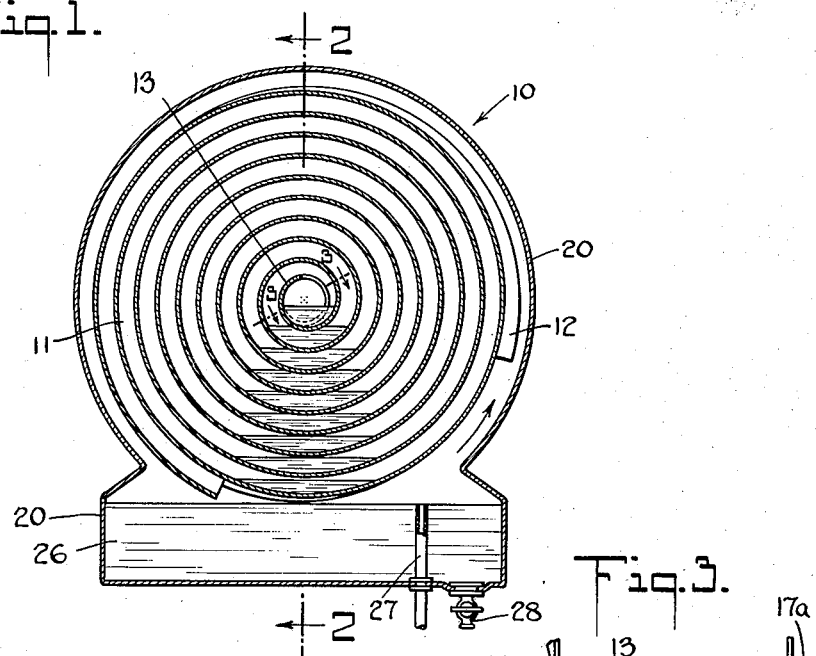
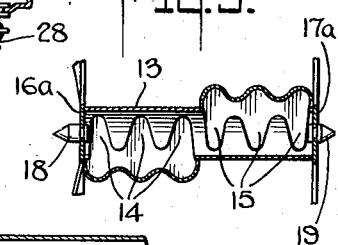
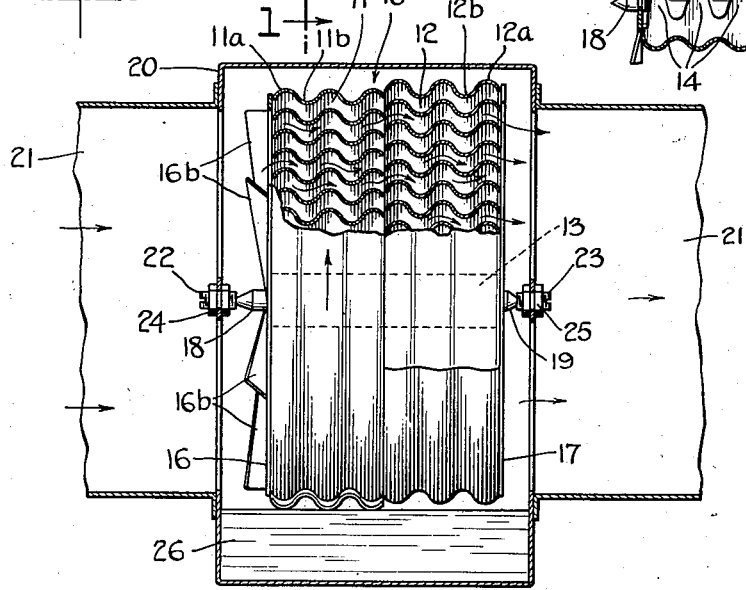
INVENTOR
Herbert A. Faber
BY
Henry J. Lucke
HIS ATTORNEY Patented Jan. 18, 1938

2,106,025

UNITED STATES PATENT OFFICE 2,106,025

AIR FILTER AND HUMIDIFIER

Herbert Alfred Faber, Cincinnati, Ohio

Application July 14, 1936, Serial No. 90,457

6 Claims. (Cl. 261—92)

This invention relates to a device for filtering and humidifying air, and is particularly adapted to the conditioning of air in homes, offices, or other building enclosures where efficient air conditioning is desired at a minimum expense and a minimum spacial encumbrance.

Outstanding features of the present invention include low original and low operating costs, ruggedness and durability of structure, and positivity and efficiency of action.

In general, preferred structural embodiments of the invention include a set or sets of spiral units, each unit comprising a strip of rigid waterproof material, usually sheet metal, corrugated to provide alternate ridges and grooves extending along its length, and coiled loosely about its width as an axis, to form a spiral. Each set of units comprises two spiral units mutually adjacent laterally, coextensive dimensionally one with the other but having their respective spirals directed oppositely one from the other, and joined at their centers to provide a conduit for the passage of liquid therebetween.

The set or sets of so related spiral units are mounted, and desirably anti-frictionally mounted, for rotation on their centers as an axis above a body of liquid, usually water, or water containing an added dust collecting substance such as silica gel gum trajacant, or any suitable tacky material, the location of the units being such with respect to the body of liquid that, upon rotation of the units, the free end of the spirals will dip under the surface of the liquid.

The device is desirably mounted within an airflow conduit or within a duct-housing through which air may be caused to flow either by forced draft means or as natural convection currents. Suitable means may be provided for rotation by the passing air stream, and for therewith imparting rotation to the spiral units.

As the units rotate simultaneously in the same direction, the free end of one spiral dips under the surface of the liquid at each revolution picking up a quantity of liquid and transporting it progressively upward to the central conduit. Thence the liquid passes to the adjacent spiral of the set, and is transported progressively downward to return to the body of liquid via the free end of the second spiral.

Successive convolutions of the spirals are preferably sufficiently close to allow contact of under surfaces with the liquid as it passes through the respective spirals. Air flowing between convolutions of the spirals during rotation of same is brought into intimate humidifying and filtering contact with the moistened surfaces thereof, and passes therefrom in a conditioned status.

In the drawing illustrating a preferred embodiment of the present invention:—

Fig. 1 represents a vertical section through the device in operation, the section being taken on the line 1—1 of Fig. 2.

Fig. 2 represents a vertical section taken on the line 2—2, Fig. 1. The lower portion of the spiral units is illustrated in elevation.

Fig. 3 represents a horizontal section taken on the line 3—3, Fig. 1, disclosing the nature of the connection of the inner ends of the spiral units with the interconnecting conduit.

Referring to the drawing, the numeral 10 indicates a set of spiral units 11 and 12 disposed adjacent laterally of each other, oppositely directed, and interconnected at their centers by a conduit 13.

The respective spiral units 11 and 12 are mechanically balanced, and are advantageously formed from a length of a strip of rigid waterproof material wound upon itself to the desired spiral configuration. The strip of material is provided along its length with liquid retaining means, the same being easily had by corrugating the strip lengthwise to provide a series of alternate ridges and grooves across the width thereof, as indicated at 11a and 11b respectively, and 12a and 12b respectively, in Fig. 2.

The respective spiral units 11 and 12 are mounted in side by side oppositely directed relation on a conduit element 13, their inner ends opening thereinto, see Fig. 3, through respective coordinatingly configurated openings 14 and 15, of the conduit.

The conduit 13 is closed at its ends by the central portions 16a and 17a of apertured end plates 16 and 17 respectively, such end plates being substantially coextensive in over-all dimension with the lateral sides of the spiral units, and including at their geometrical centers journal means, desirably in the form of the antifriction, needle-point, stub shafts 18 and 19, respectively.

The set of spiral units 10, as thus assembled, is advantageously housed within the casing 20, and such casing is advantageously included as a component portion of an air conduit 21 of an air circulating system, or of a duct housing designed specially therefor. The casing 20 is provided with mutually aligned and opposing bearing elements, for coordination with the journal means of the set of spiral units in effecting support of, and providing for rotation of same. The bearing elements are desirably adjustable, and, as illustrated, may comprise the recess-ended elements 22 and 23 disposed in threaded engagement with female threaded elements 24 and 25, respectively, rigidly secured to opposing sides of the casing 20 at appropriate mutually aligned locations therein.

The end plates 16 and 17 are apertured in a suitable manner to allow free flow of air laterally through the spiral units. The plate 16 may include the vanes 16b, preferably formed as a stamping from, and integral with, the plate 16, and directed to intercept the passing currents of air to effect rotation of the set of spiral units 10. Because of the anti-friction mounting of the set of spiral units and because of their mechanical balance, rotation will be effected easily, and will be maintained constantly by relatively slight air currents.

Disposed proximately below the set of spiral units 10 and desirably confined in the lower portion of the casing 20 is a body of humidifying liquid 26, usually water with a dust collecting agent such as silica gel or gum trajacant added thereto. The body of liquid 26 is constantly maintained at a level such that the free end of that spiral unit i. e. the spiral unit 12 in the illustrated embodiment, directed toward the direction of rotation of the set of spiral units, will dip below the surface of the liquid at each revolution, will pick up a quantity of the liquid, and cause transportation of same progressively through successive spiral convolutions to the central conduit 13.

Accordingly, as the set of spiral units rotate, a portion of the liquid 26 will be constantly elevated by the spiral unit 11 to the central conduit 13, and will flow therefrom into the spiral unit 12 for progressive descent through successive spiral convolutions and final discharge into and return to the maintained body of liquid 26.

It will be noted that for maximum efficiency successive convolutions of the spiral units should be spaced sufficiently close that the liquid rising and descending therethrough will contact and thoroughly moisten both the upper and lower surface of each convolution.

Air flowing laterally through the set of spiral units will necessarily pass in intimate contact with the moistened surfaces of the spiral convolutions, and will be thus thoroughly filtered and humidified.

A uniform level of the body of liquid 26 may be maintained by constantly augmenting the liquid from an outside source (not shown), any surplus being removed through an overflow pipe 27 provided at an appropriate location in the lower portion of the casing 20. A drain-cock 28 may be provided in the floor of the lower portion of the casing 20 for the purpose of flushing therefrom accumulated sludge.

Whereas, I have described my invention by reference to specific forms thereof, it will be understood that many changes and modifications may be made without departing from the spirit of the invention, as set forth in the following claims.

I claim:

1. In an air filter and humidifier, a set of two mechanically balanced spiral units disposed laterally of each other, oppositely directed, and connected at their centers by a conduit communicating with means for mounting said set of units for rotation about an axis through their spiral centers, and a body of liquid disposed below the set of spiral units and maintained at a level whereby the outer free ends of the units will dip into the liquid at each revolution of the units.

2. In an air filter and humidifier, a set of two mechanically balanced spiral units disposed laterally of each other, oppositely directed, and connected at their centers by a conduit communicating with said spiral units including liquid retaining means running parallel to and coextensively with the spiral convolutions, means for mounting said set of units for rotation about an axis through their spiral centers, and a body of liquid disposed below the set of spiral units and maintained at a level whereby the outer free ends of the units will dip into the liquid at each revolution of the units.

3. In an air filter and humidifier, a set of two mechanically balanced spiral units disposed laterally of each other, oppositely directed, and connected at their centers by a conduit communicating with the material of said spiral units being corrugated lengthwise parallel to and coextensive with the spiral convolutions to provide a series of alternate ridges and grooves across the width of each spiral, means for mounting said set of units for rotation about an axis through their spiral centers, and a body of liquid disposed below the set of spiral units and maintained at a level whereby the outer free ends of the units will dip into the liquid at each revolution of the units.

4. In an air filter and humidifier, a set of two mechanically balanced spiral units disposed laterally of each other, oppositely directed, and connected at their centers by a conduit communicating with means for mounting said set of units for rotation about an axis through their spiral centers, means affected by passing air currents for causing said set of spiral units to rotate, and a body of liquid disposed below the set of spiral units and maintained at a level whereby the outer free ends of the units will dip into the liquid at each revolution of the units.

5. In an air filter and humidifier, a set of two mechanically balanced spiral units disposed laterally of each other, oppositely directed, and connected at their centers by a conduit communicating with each, means for mounting said set of units for rotation about an axis through their spiral centers, means affected by passing air currents for causing said set of spiral units to rotate, said means comprising a set of vanes rigidly secured to a lateral face of one spiral unit, and a body of liquid disposed below the set of spiral units and maintained at a level whereby the outer free ends of the units will dip into the liquid at each revolution of the units.

6. In a humidifier and air filter, a set of two mechanically balanced spiral units disposed adjacent laterally of each other and oppositely directed, a conduit rigidly connecting the centers of said spiral units, means supporting said spiral units for anti-frictional rotation simultaneously and unidirectionally, means for imparting rotative motion to said set of units, and a body of liquid adjacent said set of units and maintained at substantially a constant level so that that free end of the spiral unit which is directed toward the direction of rotation of the unit will dip below the surface of the liquid at each revolution of the unit.

HERBERT ALFRED FABER.